US012617145B2

(12) United States Patent
Murasato

(10) Patent No.: US 12,617,145 B2
(45) Date of Patent: May 5, 2026

(54) IMPRINT DEVICE, IMPRINT METHOD, AND METHOD FOR MANUFACTURING ARTICLE

(71) Applicant: CANON KABUSHIKI KAISHA, Tokyo (JP)

(72) Inventor: Naoki Murasato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 18/619,870

(22) Filed: Mar. 28, 2024

(65) Prior Publication Data

US 2024/0336003 A1    Oct. 10, 2024

(30) Foreign Application Priority Data

Apr. 10, 2023    (JP) ................................. 2023-063629

(51) Int. Cl.
| | |
|---|---|
| *B29C 59/02* | (2006.01) |
| *B29C 33/34* | (2006.01) |
| *B29C 33/42* | (2006.01) |
| *B29C 59/00* | (2006.01) |

(52) U.S. Cl.
CPC ............ *B29C 59/022* (2013.01); *B29C 33/34* (2013.01); *B29C 33/424* (2013.01); *B29C 59/002* (2013.01)

(58) Field of Classification Search
CPC ..... B29C 33/34; B29C 59/022; B29C 59/002; B29C 33/424; G03F 7/0002
See application file for complete search history.

(56) References Cited

U.S. PATENT DOCUMENTS

| | | | |
|---|---|---|---|
| 7,535,549 B2 | 5/2009 | Cherala et al. | |
| 10,732,522 B2 * | 8/2020 | Komaki | ................ G03F 9/7042 |

FOREIGN PATENT DOCUMENTS

| | | |
|---|---|---|
| JP | 2010267973 A | 11/2010 |
| JP | 2017079242 A | 4/2017 |
| KR | 1020220102564 A | 7/2022 |

OTHER PUBLICATIONS

Office Action issued in Korean Appln. No. 10-2024-0046377 mailed on Jan. 6, 2026.

* cited by examiner

*Primary Examiner* — Monica A Huson
(74) *Attorney, Agent, or Firm* — ROSSI, KIMMS & McDOWELL LLP

(57) ABSTRACT

An imprint apparatus performing imprint processing for molding an imprint material on a substrate using a mold includes a shape correction mechanism configured to correct a shape of the mold using a plurality of contact portions for applying a force to side surfaces of the mold, a detection unit configured to detect contact states of the plurality of contact portions, and a control unit configured to perform a stabilizing operation of moving the mold toward a stable position by adjusting drive timings of the plurality of contact portions in accordance with an output of the detection unit.

11 Claims, 10 Drawing Sheets

FIG. 6

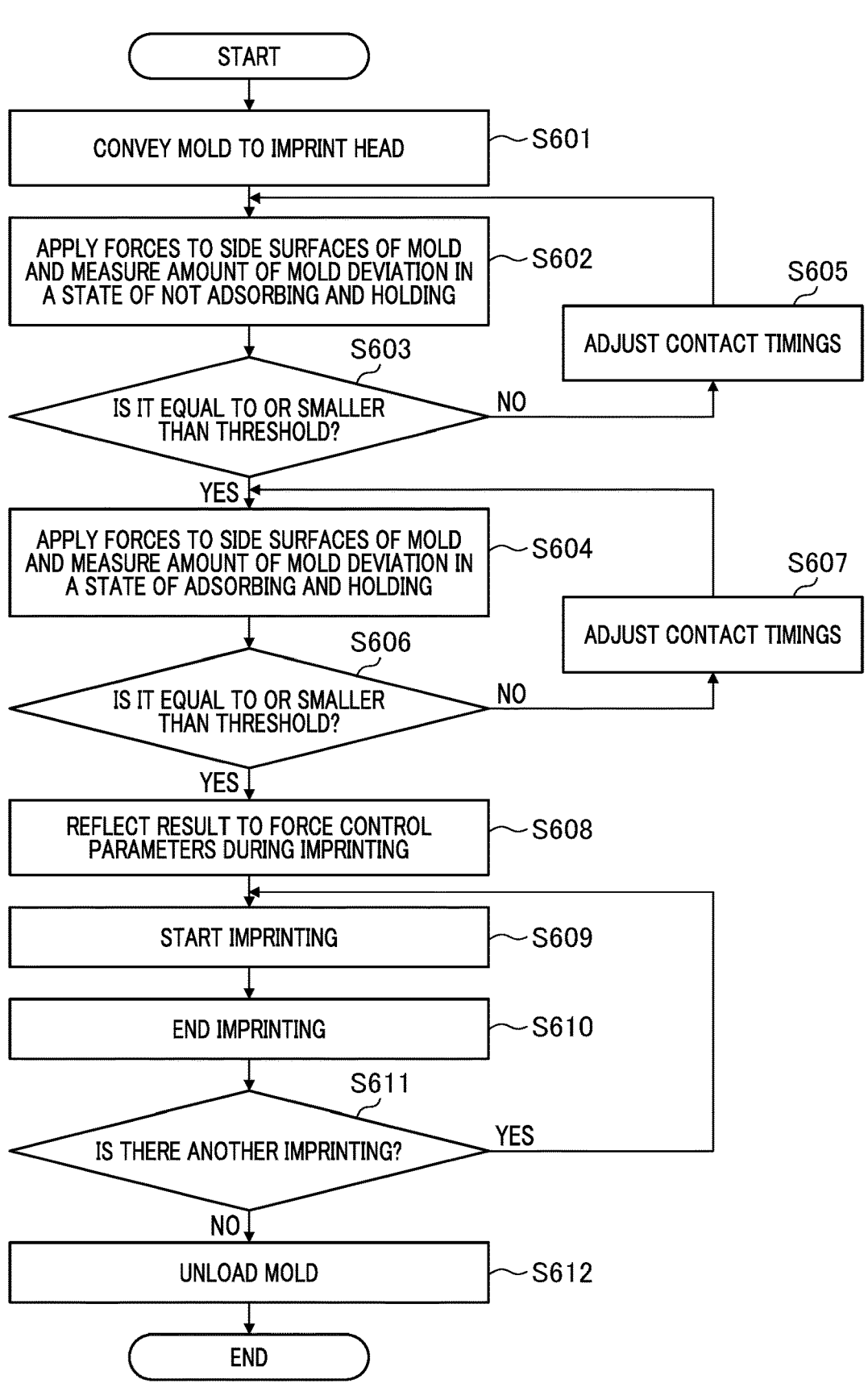

START

CONVEY MOLD TO IMPRINT HEAD — S601

APPLY FORCES TO SIDE SURFACES OF MOLD AND MEASURE AMOUNT OF MOLD DEVIATION IN A STATE OF NOT ADSORBING AND HOLDING — S602

S603
IS IT EQUAL TO OR SMALLER THAN THRESHOLD?

NO

S605
ADJUST CONTACT TIMINGS

YES

APPLY FORCES TO SIDE SURFACES OF MOLD AND MEASURE AMOUNT OF MOLD DEVIATION IN A STATE OF ADSORBING AND HOLDING — S604

S606
IS IT EQUAL TO OR SMALLER THAN THRESHOLD?

NO

S607
ADJUST CONTACT TIMINGS

YES

REFLECT RESULT TO FORCE CONTROL PARAMETERS DURING IMPRINTING — S608

START IMPRINTING — S609

END IMPRINTING — S610

S611
IS THERE ANOTHER IMPRINTING?

YES

NO

UNLOAD MOLD — S612

END

FIG. 8A

END SURFACE
POSITION OF MASK

P

Q

R

13a

13b

13c 0     t₁     t₂     t₃     t₄     t₅

TIME

FIG. 8B

END SURFACE
POSITION OF MASK 0     t₁     t₂     t₃     t₄     t₅

TIME

IMPRINT DEVICE, IMPRINT METHOD, AND METHOD FOR MANUFACTURING ARTICLE

BACKGROUND OF THE INVENTION

Field of the Invention

The present invention relates to an imprint apparatus, an imprint method, a method for manufacturing an article, and the like.

Description of the Related Art

In imprint apparatuses for manufacturing semiconductor devices or the like, a pattern is formed by pressing a mold having a pattern formed thereon onto a substrate coated with an imprint material (for example, a photocurable resin) and curing the imprint material with ultraviolet light.

At this time, regarding the mold and the silicon substrate, the mold and the silicon substrate are positionally aligned based on alignment marks before imprinting and during imprinting. A mold shape correction unit for correcting the shape of the mold is also driven and controlled so as to correct the shape of the mold during an alignment step.

Japanese Patent Laid-Open No. 2010-267973 discloses a balance between forces applied to a mold during operation of respective actuators in an actuator system in which the size of a pattern can be changed by applying forces to side surfaces of the mold. In addition, Japanese Patent Laid-Open No. 2017-79242 discloses a method for preventing positional deviation of a mold during an imprint sequence.

However, in both the patent documents, adjustment of an initial position of a mold with respect to an imprint head when mounting the mold is not taken into consideration so that the position of the mold may deviate during an imprint cycle. For this reason, it takes time for a step of aligning the mold and a substrate, resulting in decrease in productivity.

SUMMARY OF THE INVENTION

According to an aspect of the present invention, an imprint apparatus performing imprint processing for molding an imprint material on a substrate using a mold includes a shape correction mechanism configured to correct a shape of the mold using a plurality of contact portions for applying a force to side surfaces of the mold; and at least one processor or circuit configured to function as: a detection unit configured to detect contact states of the plurality of contact portions, and a control unit configured to perform a stabilizing operation of moving the mold toward a stable position by adjusting drive timings of the plurality of contact portions in accordance with an output of the detection unit.

Further features of the present invention will become apparent from the following description of embodiments with reference to the attached drawings.

BRIEF DESCRIPTION OF THE DRAWINGS

FIG. 6 is a flowchart showing an example of a processing flow of an imprint method according to First Embodiment.

FIGS. 8A and 8B are explanatory views of an example of change in output values of mold position sensors according to First Embodiment.

FIGS. 9A and 9B are explanatory views of an example of change in forces of the load cells according to Second Embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
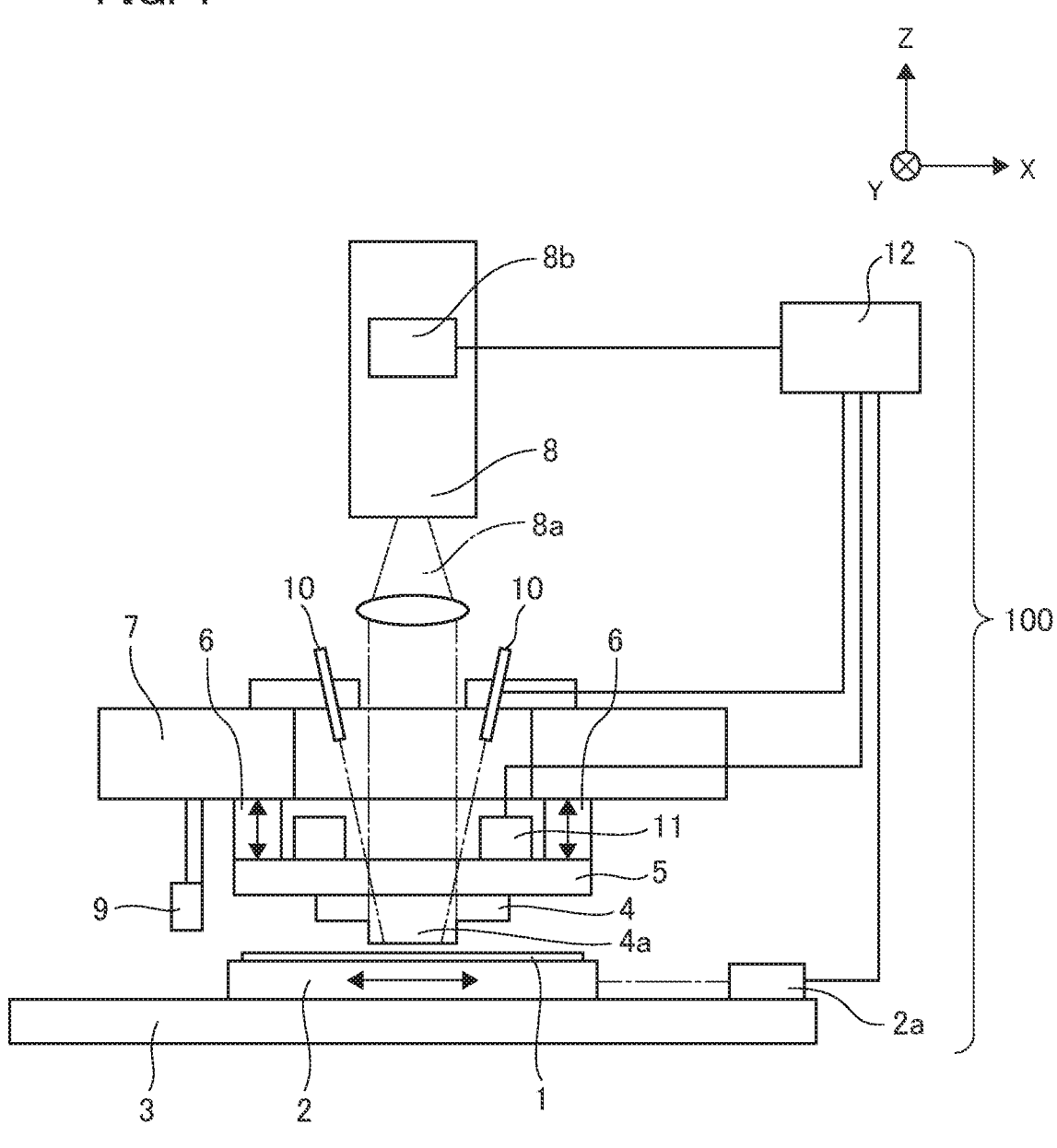
FIG. 1 is a view showing an example of a constitution of an imprint apparatus according to First Embodiment.

FIG. 1 is a view showing an example of a constitution of an imprint apparatus according to First Embodiment. An imprint apparatus 100 of First Embodiment sequentially forms patterns in a plurality of shot regions on a substrate by repeating imprint processing for molding an imprint material on the substrate using a mold.

That is, by pressing a pattern of a mold 4 onto an imprint material consisting of a photocurable composition (also referred to as an imprint resist or a photocurable resin) supplied to a surface of a substrate 1, an element pattern corresponding to the mold pattern is formed on the imprint material on the surface of the substrate.

In a substrate stage 2, by moving the substrate 1 in an XY direction and a rotation direction within an XY plane, an imprint region at an arbitrary position on the substrate 1 can be moved to a location under the mold. In the substrate stage 2, a displacement sensor 2a for detecting a movement position is provided so that the substrate stage 2 can be driven by a motor based on a detection value and can be moved to an exact position. A laser interferometer, an encoder, or the like is used as the displacement sensor 2a. A base frame 3 guides and holds the substrate stage 2.

A rugged pattern is carved on a surface of a pattern portion 4a of the mold 4, and the pattern of the pattern portion 4a is transferred to an imprint material on the substrate 1 by imprinting the pattern portion 4a onto the imprint material on the surface of the substrate 1. In order to prevent parts other than the pattern portion 4a from coming into contact with the substrate 1, the pattern portion 4a protrudes from the mold 4.

A mold holding portion 5 for holding the mold 4 is held by a main body surface plate 7 with imprint drive devices 6 performing vertical driving therebetween, and the imprint drive devices 6 perform driving for pressing the mold 4 onto an uncured imprint material on the substrate.

An ultraviolet light generation device 8 generates ultraviolet light 8a. An uncured imprint material is irradiated with the ultraviolet light 8a which has been transmitted through the transparent mold 4, and the imprint material is cured. A shutter portion 8*b* for blocking irradiation light is provided inside the ultraviolet light generation device 8.

A dispenser 9 is provided in the main body surface plate 7. The imprint region of the substrate 1 is moved to a location under the dispenser 9, and the imprint region is coated with an imprint material by the dispenser 9. In order to perform imprint processing, the substrate stage 2 repeatedly moves between a location under the dispenser 9 and a location under the pattern portion 4*a*.

The dispenser 9 need not necessarily be provided inside the apparatus, and the substrate 1 which has been coated with an imprint material or to which an imprint material is evenly applied in advance outside the apparatus may be mounted in the imprint apparatus. Further, a constitution in which imprint operation is repeatedly performed by moving the substrate 1 in steps at a predetermined pitch by the substrate stage 2 may be adopted. In this case, since steps for coating with an imprint material and the like inside the imprint apparatus are not necessary, productivity can be improved.

An optical lens, a lighting, and an image detection sensor are provided inside each of scopes 10, which detects relative positional deviation between the mold 4 and alignment marks individually provided on the substrate 1. Deviation can be corrected by slightly moving the substrate stage 2 in accordance with the amount of deviation so that the mold 4 and the substrate 1 can be positionally aligned.

Mold shape correction units 11 are mounted on the mold holding portion 5 and can change the shape of the mold 4 by applying a force to a plurality of spots on side surfaces of the mold 4. Here, the mold shape correction units 11 function as shape correction mechanisms for correcting the shape of the mold using a plurality of contact portions for applying a force to the side surfaces of the mold.

A control unit 12 performs optimal positional alignment control based on positional alignment information acquired from the scopes 10, positional information of the substrate stage 2, information of loads applied by the mold shape correction units, and the like.

The control unit 12 has a CPU (not shown) serving as a computer and controls operation of each of the units and the portions in the entire imprint apparatus based on a computer program stored in a memory (not shown) serving as a storage medium.

Figure 2:
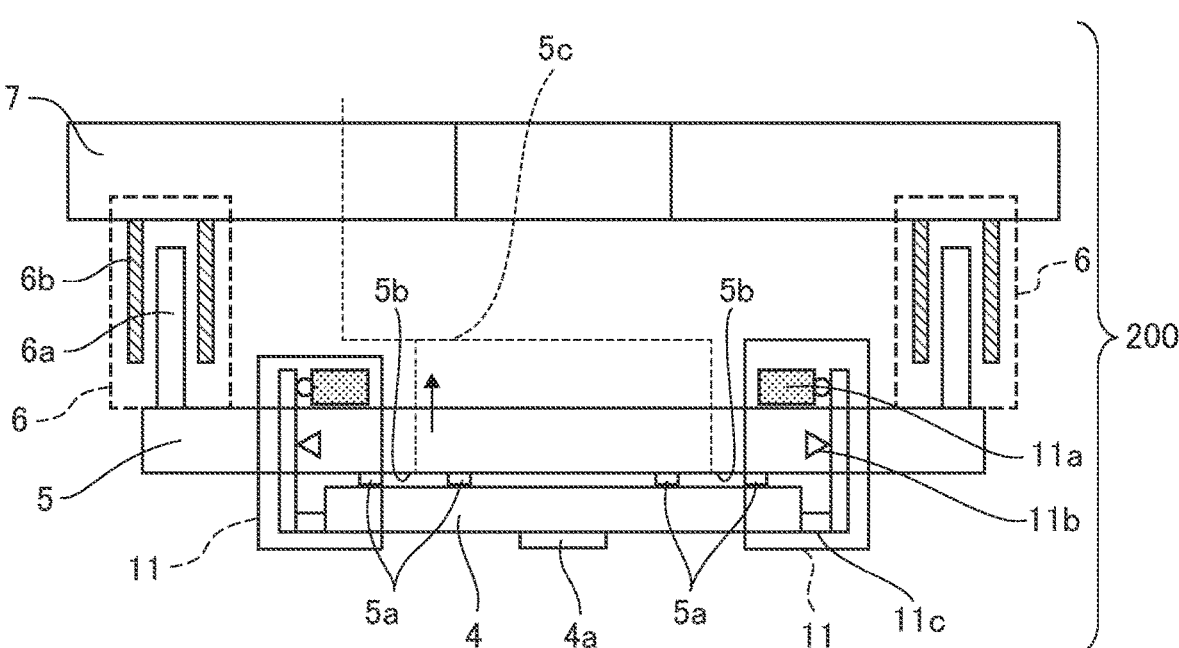
FIG. 2 is a cross-sectional view of an imprint head 200 according to First Embodiment.

FIG. 2 is a cross-sectional view of an imprint head 200 according to First Embodiment. The mold holding portion 5 holds the mold 4 in the imprint head 200 by adsorbing it. That is, a rear surface of the mold 4 and the mold holding portion 5 come into contact with each other at adsorption projection portions 5*a*, and vacuum pipings 5*c* are connected thereto in order to vacuum-suction an adsorption region 5*b* surrounded by the contact portions.

For example, each of the imprint drive devices 6 is constituted of a voice coil motor, a linear shaft motor, or the like and has a movable portion 6*a* and a fixed portion 6*b*. The imprint drive devices 6 of First Embodiment have no friction parts and have a constitution advantageous to a risk of generation of foreign matter. However, even drive sources having friction parts, such as rotary motors with a ball screw, air cylinders, and piezo-element actuators, can be used as the imprint drive devices 6 by providing foreign matter suctioning measures.

The mold holding portion 5 is provided with the mold shape correction units 11, which are each constituted of a drive source 11*a*, a drive transmission portion 11*b*, and a load cell 11*c* and can change the mold shape by applying a desired force to the side surfaces of the mold. A force generated by the drive source 11*a* is converted by the drive transmission portion 11*b* according to the principle of leverage and is applied to the side surfaces of the mold through the load cell 11*c* serving as a contact portion.

By using such a structure, ranges of a force generated by the drive source and a force desired to be applied to the mold can be adjusted depending on a fulcrum position of the drive transmission portion 11*b*. In addition, there is an advantage that the drive source 11*a* can be disposed on a relatively spacious upper surface of the mold holding portion 5.

However, the structure of the mold shape correction unit 11 is not limited to this. For example, any structure may be adopted as long as it can apply a desired force to the side surfaces of the mold, such as a structure in which a load cell and a drive source are arranged in series.

Figure 3:
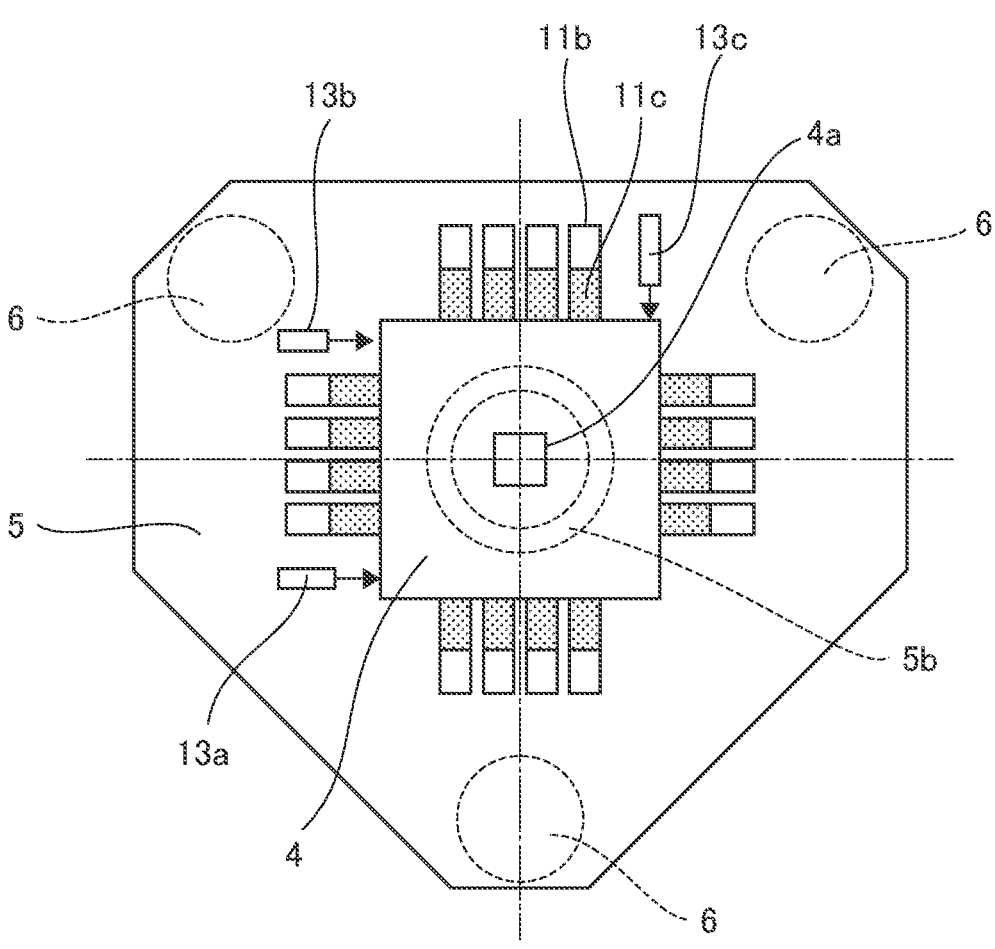
FIG. 3 is a view of the imprint head shown in FIG. 2 viewed in a bottom surface direction.

FIG. 3 is a view of the imprint head shown in FIG. 2 viewed in a bottom surface direction. As shown in FIG. 3, there are three imprint drive devices 6 in the mold holding portion 5, and the mold 4 is adsorbed and held at the center. The adsorption region 5*b* is provided on the rear surface of the mold 4, and the mold 4 is adsorbed and held thereon.

A plurality of sets of the mold shape correction units 11 each constituted of a set of the drive source 11*a*, the drive transmission portion 11*b*, and the load cell 11*c* are disposed around the mold 4. In First Embodiment, four mold shape correction units 11 are uniformly arranged on each side surface of the mold 4, and sixteen mold shape correction units 11 in total are used.

The number of mold shape correction units 11 can be determined depending on the size of the mold 4, the shape to be corrected, or the amount of correction.

Mold sensors 13*a* to 13*c* for measuring positions of the side surfaces of the mold 4 are disposed around the mold 4. Each sensor is held by the mold holding portion 5 and is a non-contact sensor or the like utilizing laser interference capable of measuring positional change of end surface portions of the mold.

Although three mold sensors 13*a* to 13*c* are shown, four or more may be provided. In addition, the mold sensors 13*a* to 13*c* function as detection units for detecting contact states of the plurality of contact portions.

Furthermore, depending on characteristics of a mold material, non-contact sensors such as eddy current sensors or electrostatic capacitance sensors can also be used as mold sensors. In addition, although a risk of generation of particle increases, contact-type measurement instruments such as dial gauges may also be used as mold sensors by providing foreign matter suctioning measures.

The mold sensors 13*a* to 13*c* can measure the amounts of movement of the mold in directions of X, Y, and θz (rotation of a Z axis) by measuring end surfaces of the mold at three positions. In order to accurately measure the amount of Oz movement, each of the mold sensors is disposed at a position close to one of four corners of the mold. However, as long as the layout allows, they may not be disposed close to four corners as above and may be disposed in gap spaces between the load cells of the mold shape correction units 11, or the like.

In addition, since measurement values of the mold sensors are also affected by the mold size according to the mold shape correction units 11, there is a need to calculate the amount of movement of the mold by eliminating displacement according to the mold size. The number of mold sensors can also be increased in further consideration of the amount of change in mold shape and measurement accuracy.

For example, eight mold sensors in total can also be used by disposing two mold sensors at each of the four corners of the mold 4 in the XY direction.

Figure 4A:
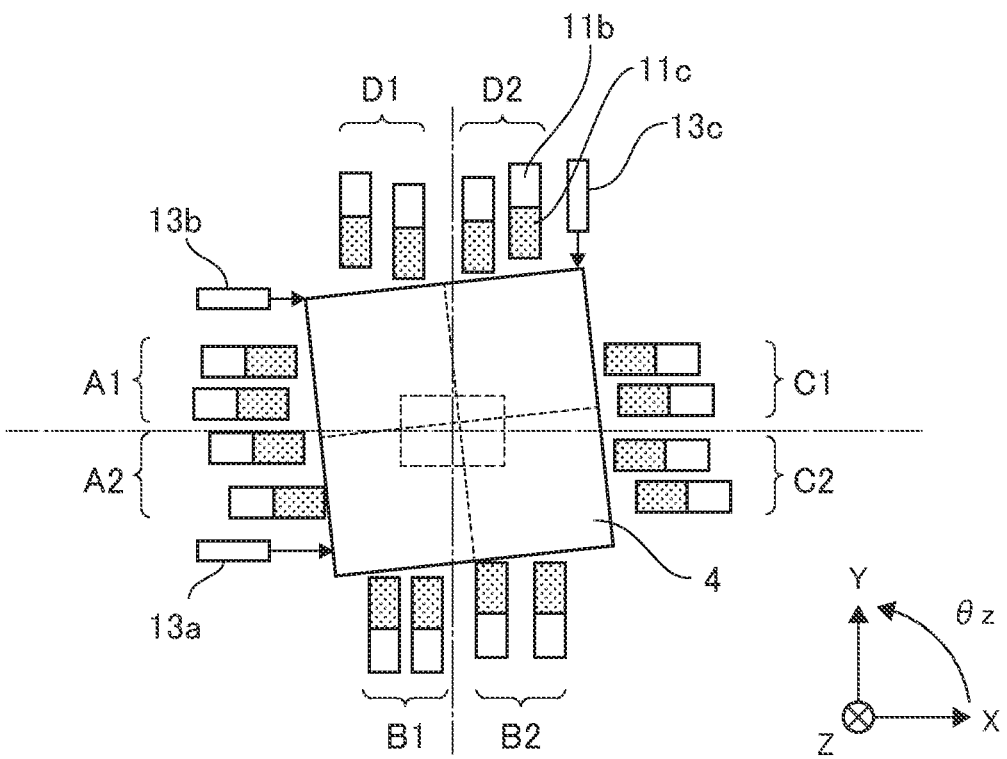
FIGS. 4A and 4B are views of movement of a mold viewed in the bottom surface direction when positional deviation of the mold has occurred.
Figure 4B:
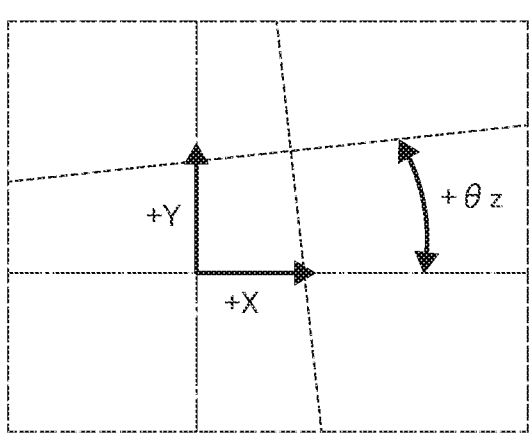

FIGS. 4A and 4B are views of movement of the mold viewed in the bottom surface direction when positional deviation of the mold has occurred, and parts not related to the description are omitted. When the shape of the mold is corrected by the mold shape correction units 11, processing starts with a step of bringing the load cells 11c into contact with the end surfaces of the mold 4.

At this time, a timing of issuing a command to the drive source is set to the same timing for each of an X axis direction and a Y axis direction. However, as shown in FIG. 4A, there may be a difference in contact timing between the load cells 11c. As a result, even when the mold 4 is adsorbed and held by the mold holding portion 5, a bias in force due to the difference in contact timing may overcome an adsorption holding force and cause positional deviation.

FIG. 4A schematically shows an example in which the center of the mold deviates in directions of positive X, positive Y, and positive Oz. FIG. 4B is an explanatory detail diagram of the direction of deviation. If contact of all the load cells 11c with the end surfaces of the mold ends after the state of FIG. 4A, the mold is further moved to a balanced stable position due to the sum of a resultant force of the forces from the respective load cells 11c and a reaction force of frictional forces due to vacuum adsorption between the rear surface of the mold and the mold holding portion 5.

Causes of positional deviation of the mold 4 occurring in spite of the contact timings of the load cells 11c set to be the same in every axial direction include an error in control of the mold shape correction units. However, in addition to this, the causes may also include geometric errors between tips of the load cells 11c and the end surfaces of the mold 4, fluctuation in frictional force between the rear surface of the mold 4 and the mold holding portion 5, and the like.

In addition, positional deviation of the mold 4 may occur every time the mold shape correction units 11 are driven during an imprint cycle, and a step for positional alignment between the mold 4 and the substrate 1 requires extra time. Therefore, decrease in productivity of the imprint apparatus is caused.

Hence, in First Embodiment, in order to reduce the amount of movement in each direction, adjustment is performed by advancing or delaying the contact timing of the load cell 11c related to the direction. In FIGS. 4A, A1, A2, B1, B2, C1, C2, D1, and D2 each indicate a pair of mold shape correction units 11.

In FIG. 4A, in order to reduce movement in the positive X axis direction, for example, the timings of the load cells 11c of the mold shape correction units 11 of A1 and A2 in FIG. 4A are delayed. Further, adjustment, such as advancing the timings of the load cells 11c of the mold shape correction units 11 of C1 and C2, is performed.

Similarly in the positive Y axis direction as well, for example, the timings of the load cells 11c of the mold shape correction units 11 of B1 and B2 in FIG. 4A are delayed, and the timings of the load cells 11c of the mold shape correction units 11 of D1 and D2 are advanced.

In order to reduce movement in the positive Oz direction, the timings of the load cells 11c of the mold shape correction units 11 of A2, B2, C1, and D1 are delayed, and the timings of the load cells 11c of the mold shape correction units 11 of A1, B1, C2, and D2 are advanced. An optimal contact timing of each of the load cells can be determined by repeating adjustment of the timing of each load cell and measurement of the amount of deviation of the mold such that the amount of deviation of the mold is minimized.

In addition, regarding detection units for measuring the positional deviation of the mold so as to detect the contact states of the contact portions, in addition to the mold sensors 13a, 13b, and 13c held by the mold holding portion 5, the scopes 10 shown in FIG. 1 may be used.

That is, in a state in which the mold and the substrate are in non-contact with each other, marks provided in the mold and marks provided in the substrate stage 2 may be measured, and the contact states of the load cells 11c serving as contact portions may be detected by measuring deviation between relative positions of both the marks using the scopes 10.

When the numbers of scopes and marks are larger than that of mold sensors, the amount of deformation of the mold by the mold shape correction units can be measured with higher accuracy, and thus measurement accuracy of positional deviation of the mold can be enhanced.

In this manner, in First Embodiment, a stabilizing operation of moving the mold toward a stable position is performed by adjusting drive timings of the plurality of contact portions in accordance with outputs of the mold sensors serving as detection units. In addition, in First Embodiment, this stabilizing operation is performed at least before actual imprint processing. Moreover, the foregoing stabilizing operation may also be performed during actual imprint processing.

Here, actual imprint processing denotes imprint processing for producing a semiconductor having a pattern formed thereon by imprint processing. For example, the stabilizing operation according to First Embodiment may be executed when imprint processing is performed on an imprint material for priming.

Figure 5A:
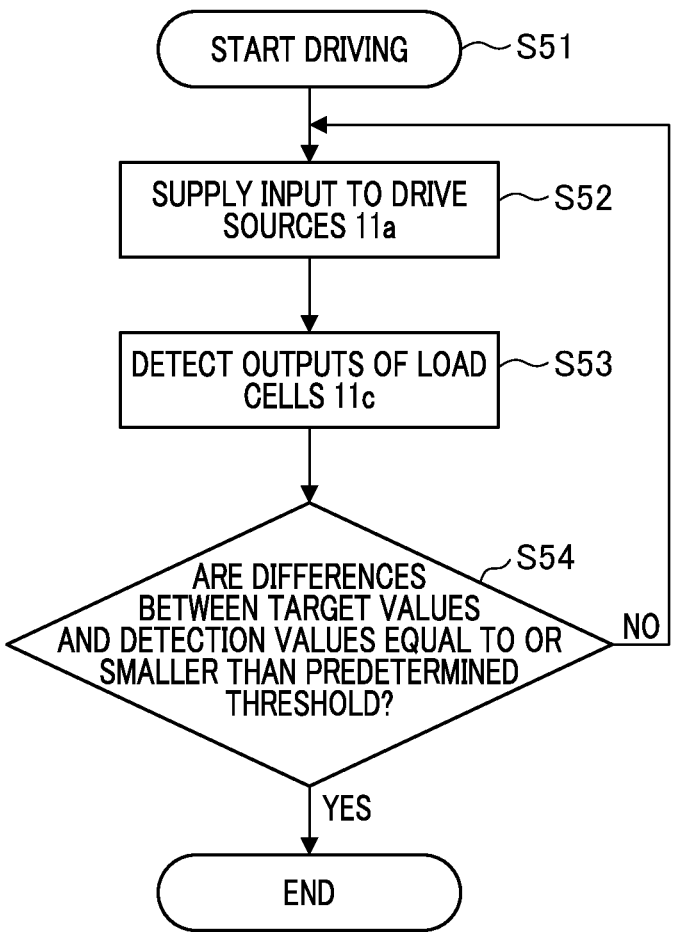
FIG. 5A is an explanatory flowchart of a control flow of a drive source according to First Embodiment.
Figure 5B:
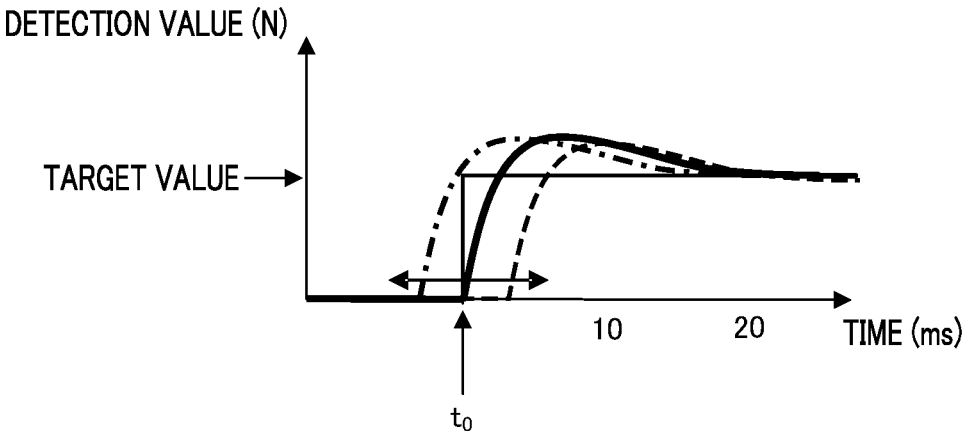
FIG. 5B is a view showing an example of force change in load cells.

Next, FIG. 5A is an explanatory flowchart of a control flow of the drive source according to First Embodiment, and FIG. 5B is a view showing an example of force change in the load cells. Operation of each step of the flowchart in FIG. 5A is sequentially performed by the CPU or the like, which serves as a computer inside the control unit 12, executing the computer program stored in the memory.

Step S51 to Step S54 in FIG. 5A indicate a correction step of correcting the mold shape using the plurality of contact portions for applying a force to the side surfaces of the mold, and driving of the drive sources 11a starts at a desired starting timing in Step S51. Further, in Step S52, inputs are supplied such that drive forces of the drive sources 11a reach predetermined target values.

Thereafter, in Step S53, forces applied to the mold 4 are detected by detecting the amounts of displacement of the load cells 11c using the mold sensors 13a to 13c, and detection values are output. Here, Step S53 functions as a detection step of detecting the contact states by the plurality of contact portions.

Moreover, in Step S54, it is judged whether the differences between the foregoing target values and the foregoing detection values are equal to or smaller than a predetermined threshold. When it is judged to be No in Step S54, the processing returns to Step S52. That is, in Step S52 to Step S54, drive timings of the plurality of contact portions are adjusted while feeding back outputs of the mold sensors 13a to 13c serving as detection units. Meanwhile, when it is judged to be Yes in Step S54, the flow in FIG. 5A ends.

FIG. 5B shows an example of change in forces of the load cells. The horizontal axis indicates time, and the vertical axis indicates detection value of a force of the load cell 11c in one predetermined axial direction. In the example shown in FIG.

5B, when a drive starting timing in Step S51 is t0, the detection value of a force settles to the target value after approximately 20 msec.

As shown in FIG. 5B, if the drive starting timing in Step S51 is adjusted back and forth, forces are applied to the mold 4 with a time difference while drawing curves in shapes similar to that when starting at the time to as indicated by a one-dot dashed line and a dotted line.

FIG. 6 is a flowchart showing an example of a processing flow of an imprint method according to First Embodiment and shows an example of an imprint method for performing imprint processing for molding an imprint material on a substrate using a mold, including conveyance of the mold. Operation of each step of the flowchart in FIG. 6 is sequentially performed by the CPU or the like, which serves as a computer inside the control unit 12, executing the computer program stored in the memory.

The processing flow shown in FIG. 6 will be described along Step S601 to Step S612 numbered in order of steps. First, in Step S601, the mold is conveyed to a position under a holding position of the imprint head 200.

Figure 7:
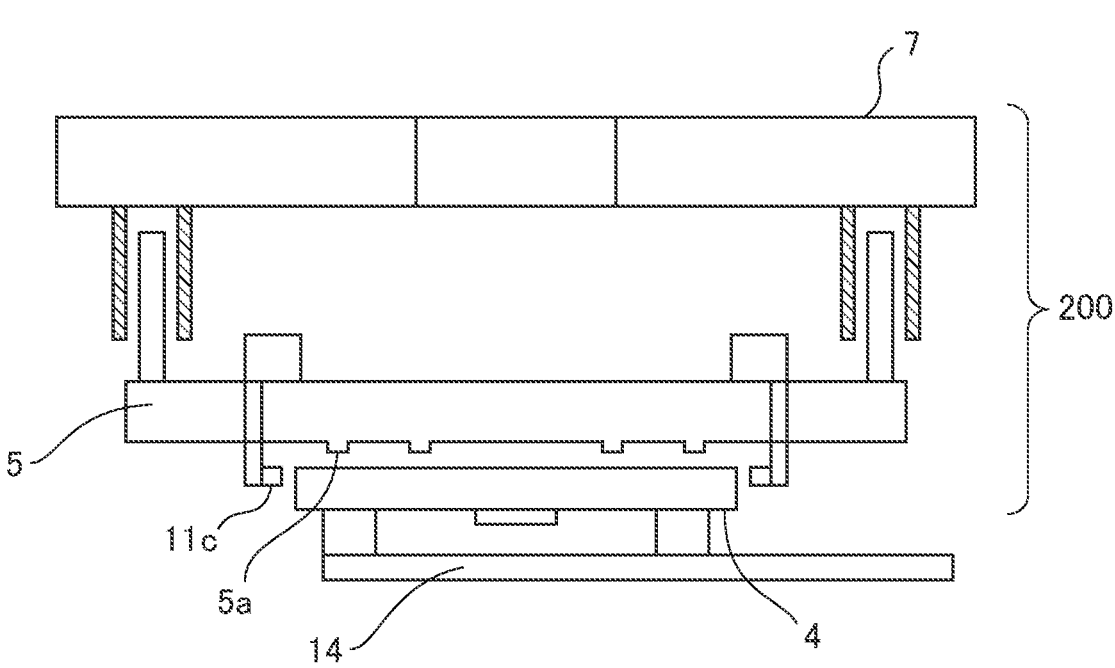
FIG. 7 is a view showing an example of the imprint head 200 and a conveyance hand 14 according to First Embodiment.

FIG. 7 is a view showing an example of the imprint head and a conveyance hand according to First Embodiment. The mold 4 is conveyed to the mold holding position of the imprint head 200 in a state of being held by a conveyance hand 14. At this point of time, the mold 4 is not subjected to vacuum adsorption on the mold holding portion 5 side, and the rear surface of the mold 4 and the adsorption projection portions 5a of the mold holding portion 5 are in a state of being in contact with each other or having a slight gap therebetween.

In Step S602, as shown in FIG. 7, the mold is in a state of being supported by the conveyance hand 14 but not being adsorbed and held by the mold holding portion 5, and adsorption-holding of the mold on the conveyance hand side is canceled. In this state, the side surfaces of the mold 4 are surrounded by the load cells 11c of the mold shape correction units 11 in a state of being able to freely perform XY movement therein.

In Step S602, next, equal forces are applied to the four side surfaces of the mold 4 from all the load cells 11c of the mold shape correction units 11 at the same time. The value of the forces at this time is a value of the maximum force or the average force that is actually applied during an imprinting step. At this time, forces having the same value are applied from all the load cells 11c such that the balance of forces applied to the side surfaces of the mold 4 becomes zero as a resultant force.

Figures 8A, 8B:
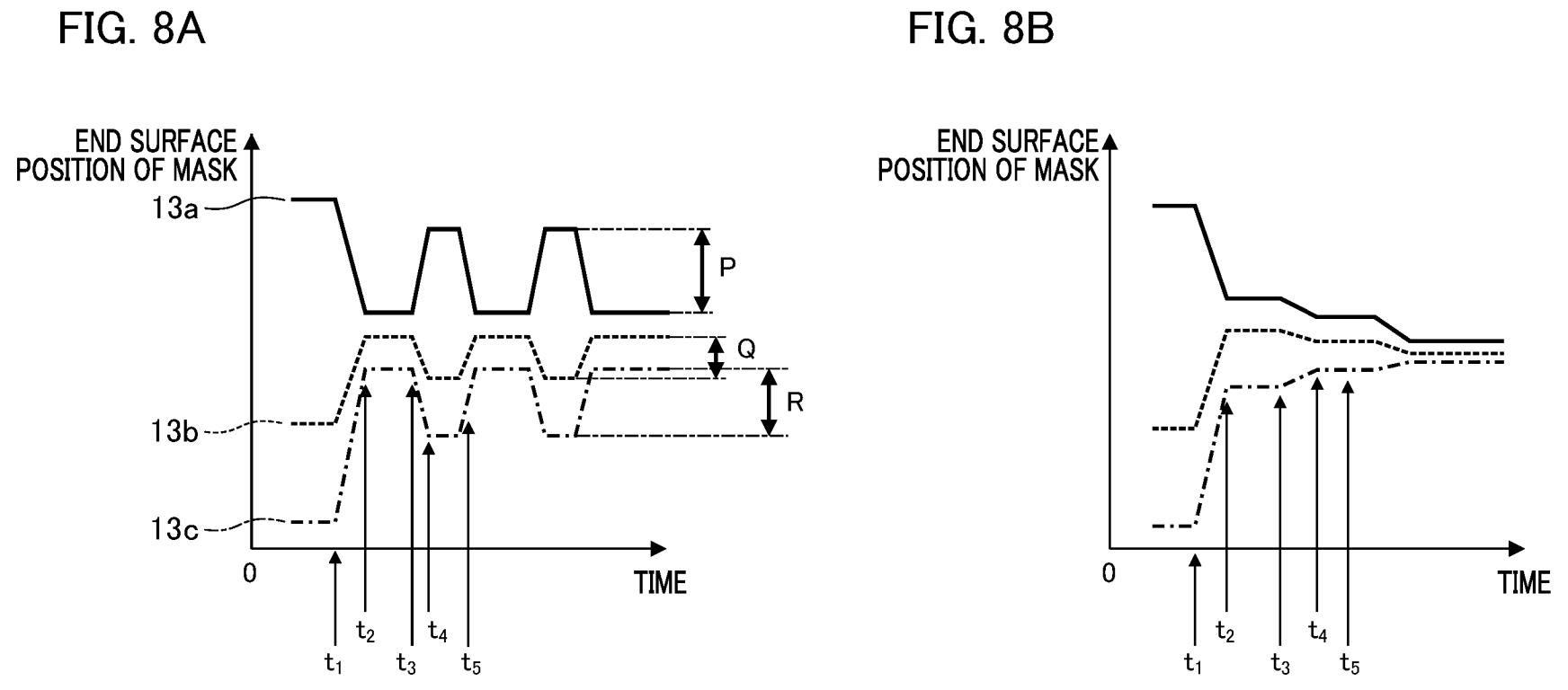

Positional change of the mold in this step will be described using FIGS. 8A and 8B. FIGS. 8A and 8B are explanatory views of an example of change in output values of mold position sensors according to First Embodiment.

In FIGS. 8A and 8B, the horizontal axis indicates time, and the vertical axis indicates output values of the mold sensors 13a, 13b, and 13c, that is, positions of the end surfaces of the mold 4. FIG. 8A shows an example of positional change of the three mold sensors. First, forces are applied from all the load cells 11c at a timing of a time t1, and the mold position starts to move significantly.

This is because the mold is held at a position very far away from a stable position where forces are balanced when it is first conveyed. Thereafter, applying forces are temporarily reduced to zero at t2, and equal forces are applied to all the load cells 11c again at a timing of t3. At this time, as indicated by the waveform at a timing of t4 in FIG. 8A, the mold position deviates significantly.

This indicates a case in which the mold position deviates significantly due to the difference in contact timing between the load cell 11c as described in FIG. 4A, and change in output values of the mold sensors have waveforms as shown in FIG. 8A, for example. Thereafter, if applying of forces to the side surfaces of the mold from all the load cells 11c ends, as indicated at t5, they return again to positions close to those at the timing of t2 from the positions which have deviated significantly.

However, the positions returned at t5 are positions where local contact between the load cells and the side surfaces of the mold and frictional forces remain, and they are not stable positions with reproducibility, and therefore, even if forces are repeatedly applied in this state, it is difficult to force the mold to a stable position.

Therefore, FIG. 8A shows that if forces are applied to the load cells 11c once again after the time t5 in a state in which the timings are not adjusted, the mold 4 bounces and returns again and is not forced to a stable position eventually.

In Step S602, from the graph of FIG. 8A, based on the output values of the three sensors, the largest amount of deviation in position of the mold 4 is calculated (measured) as ranges indicated by P, Q, and R (amount of mold deviation). In Step S603, it is judged whether or not the values of these ranges P, Q, and R are equal to or smaller than a threshold.

The threshold in Step S603 varies depending on a comparison with when deviation of the mold position has not occurred during imprinting and a correctable range of the scopes and the marks allowing alignment adjustment in a short period of time. However, for example, a value of approximately 2 to 3 μm is set as the threshold.

In Step S603, if the amount of mold deviation is equal to or smaller than the threshold, the processing proceeds to next Step S604. If the amount of mold deviation is larger than the threshold described above, in Step S605, the timings of contact with the side surfaces of the mold 4 are adjusted for respective axes based on the value in the direction of the positional deviation of the mold 4, and measurement is performed once again in Step S602. For example, the adjustment is performed by such a method described in FIG. 4A.

When the contact timings are adjusted and measurement results of equal to or smaller than the threshold are eventually obtained in Step S603, they are indicated as the waveforms shown in FIG. 8B. That is, in FIG. 8B, first, forces are applied from the respective load cells 11c at the timing of the time t1, and the mold 4 moves significantly to a spot near a stable position.

Thereafter, although forces are applied again at the timing of the time t3, the mold does not bounce even at the timings of the times t4 and t5, and the mold is gradually forced to a stable position.

Eventually, if forces are repeatedly applied three to five times, it converges at a stable position. This stable position is a position where deviation does not occur even if the processing proceeds to the imprinting step, and the position varies depending on characteristics of the mold, the imprint apparatus, and the like.

The number of times of applying forces that are required until the mold becomes stable is related to a geometric error of each unit and a condition of contact with the mold holding portion 5, and it is desirable to perform the stabilizing operation by repeatedly applying forces until deviation of the mold is eliminated or becomes equal to or smaller than a predetermined value. The foregoing predetermined value is set to be smaller than the threshold in Step S603.

In this manner, in First Embodiment, in Step S602, Step S603, and Step S605, the stabilizing operation is performed in a state in which the mold is not held in the imprint head by the holding unit.

In Step S604, in a state in which the mold 4 is not subjected to vacuum adsorption by the mold holding portion 5, similar to Step S602, forces are applied and the amount of mold deviation is measured at the contact timings adjusted in Step S602.

Thereafter, similar to Step S603, it is judged in Step S606 whether or not the amount of mold deviation is equal to or smaller than the threshold. When the amount of mold deviation is larger than the threshold in Step S606, the processing proceeds to Step S607, and similar to Step S605, the contact timings are adjusted. Here, since vacuum adsorption is actually in an ON state, adjustment can be performed while checking the amount of mold deviation in the same state as that during imprinting.

In this manner, in First Embodiment, after the stabilizing operation is performed in a state in which the mold is not held in the imprint head by the holding unit, the stabilizing operation is performed again in a state in which the mold is held in the imprint head by the holding unit.

Here, Step S602 to Step S607 function as control steps of performing the stabilizing operation of moving the mold toward a stable position by adjusting drive timings of the plurality of contact portions in accordance with outputs in the detection step.

When the amount of mold deviation is equal to or smaller than the threshold in Step S606, the processing proceeds to Step S608. In Step S608, the final contact timing being equal to or smaller than the threshold as a result of the adjustment in Step S602 to Step S607 is stored in the memory (not shown). Further, it is reflected (feedbacked) as control parameters used when each of the load cells 11c is driven during imprinting in Step S609.

In this manner, in First Embodiment, there is provided a memory (not shown) storing parameters related to adjustment of the drive timings of the plurality of contact portions when the stabilizing operation is performed.

Imprinting starts in Step S609, and imprinting ends in Step S610. In Step S611, it is judged whether or not there is an imprint region to be further imprinted using the same mold, and in the case of Yes, the processing returns to Step S609.

The control parameters which are stored in Step S608 and are used when each of the load cells 11c is driven are unique to the relationship between the individual mold and the imprint apparatus. Therefore, they can be continuously used unless the mold 4 is replaced (unloaded). That is, unless the mold 4 is replaced, there is no need to adjust the contact timings in Step S602 to Step S607 again.

In this manner, in First Embodiment, since the parameters related to adjustment of the drive timings of the plurality of contact portions when the stabilizing operation is performed are stored for each mold, and the next stabilizing operation is performed using the stored parameters when the mold is used, and thus the time for adjustment can be shortened.

Second Embodiment

Figures 9A, 9B:
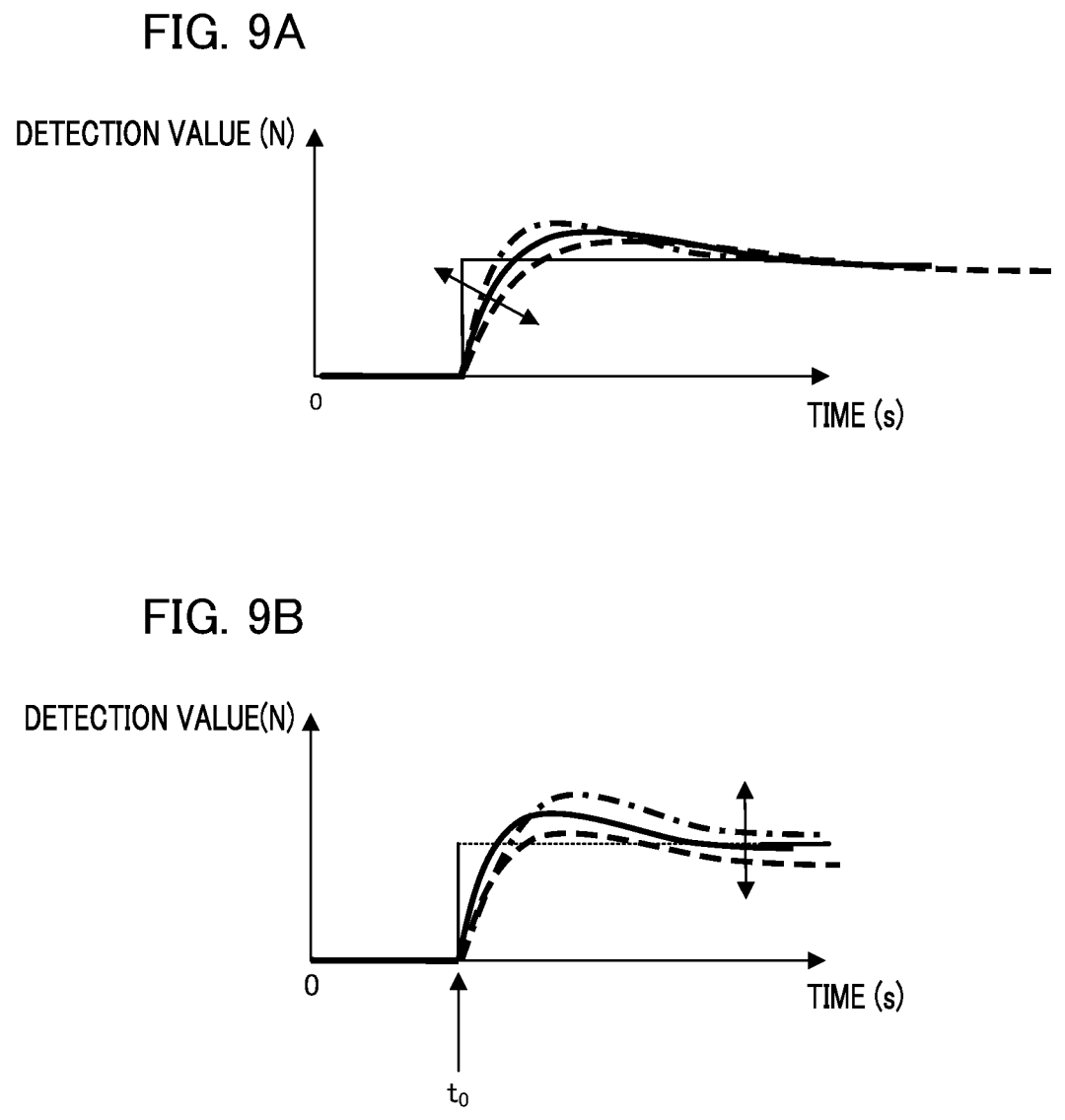

FIGS. 9A and 9B are explanatory views of an example of change in forces of the load cells according to Second Embodiment. FIGS. 9A and 9B show a modification example corresponding to the graph indicating change in forces of the load cells in FIG. 5. The horizontal axis indicates time, and the vertical axis indicates detection value of a force of the load cell 11c in one predetermined axial direction. FIG. 9A shows three kinds of waveforms having different characteristics when settled to a rising speed or a target force.

In order to impart change like these three kinds of waveforms, drive speeds of the drive sources 11a and the frequency of performing feedback control need only be changed. In addition, when the amount of mold deviation is calculated at the timings in Step S602 and Step S604 of FIG. 6, not only the amount of deviation but also a timing when deviation of the mold occurs may be detected.

Further, one of a plurality of waveforms may be selected or the waveform may be adjusted at a timing or the like that is a timing of occurrence of deviation of the mold after the load cell 11c of each axis comes into contact with the mold 4 and when forces increase. That is, in Step S605 and Step S607 of FIG. 6, the mold deviation can be adjusted more effectively by adjusting the control speed or the feedback frequency of the drive sources 11a.

Moreover, FIG. 9B is a view showing an example of a waveform when changing the target value with which forces are eventually settled. This adjustment becomes effective adjustment parameters when mold deviation occurs in Step S602 and Step S604 at the timing when applying of forces by all the load cells 11c ends.

For example, the output values of the load cell 11c are affected by geometric errors of the units and calibration errors of the mold sensors 13a, 13b, and 13c. Therefore, when these errors affect the mold deviation, the mold deviation can be corrected by adjusting the target value (drive force) with which forces are settled for each of the load cells 11c.

That is, the mold deviation may also be corrected by controlling drive forces of the load cells 11c serving as a plurality of contact portions such that errors of the mold sensors are adjusted.

Third Embodiment

In Third Embodiment, while using the constitutions of First Embodiment and Second Embodiment, the adjustment frequency is reduced using the conveyance hand 14 capable of performing highly accurate positioning. In First Embodiment and Second Embodiment, before the mold 4 is loaded and imprinting starts, an adjustment step in which the amount of mold deviation becomes equal to or smaller than the threshold is performed. Therefore, such an adjustment step is required every time the mold 4 is replaced so that there is a probability of decrease in productivity of imprinting.

Hence, in Third Embodiment, regarding the mold 4 which has once been subjected to adjustment by the imprint apparatus, the adjustment parameters of the load cells 11c acquired by the adjustment and data of the final position of the mold are stored in the memory. Further, when the mold 4 is loaded and used for imprinting, the adjustment parameters of the load cells 11c and data of the position of the mold stored in the foregoing memory are read and used from the memory.

Figure 10:
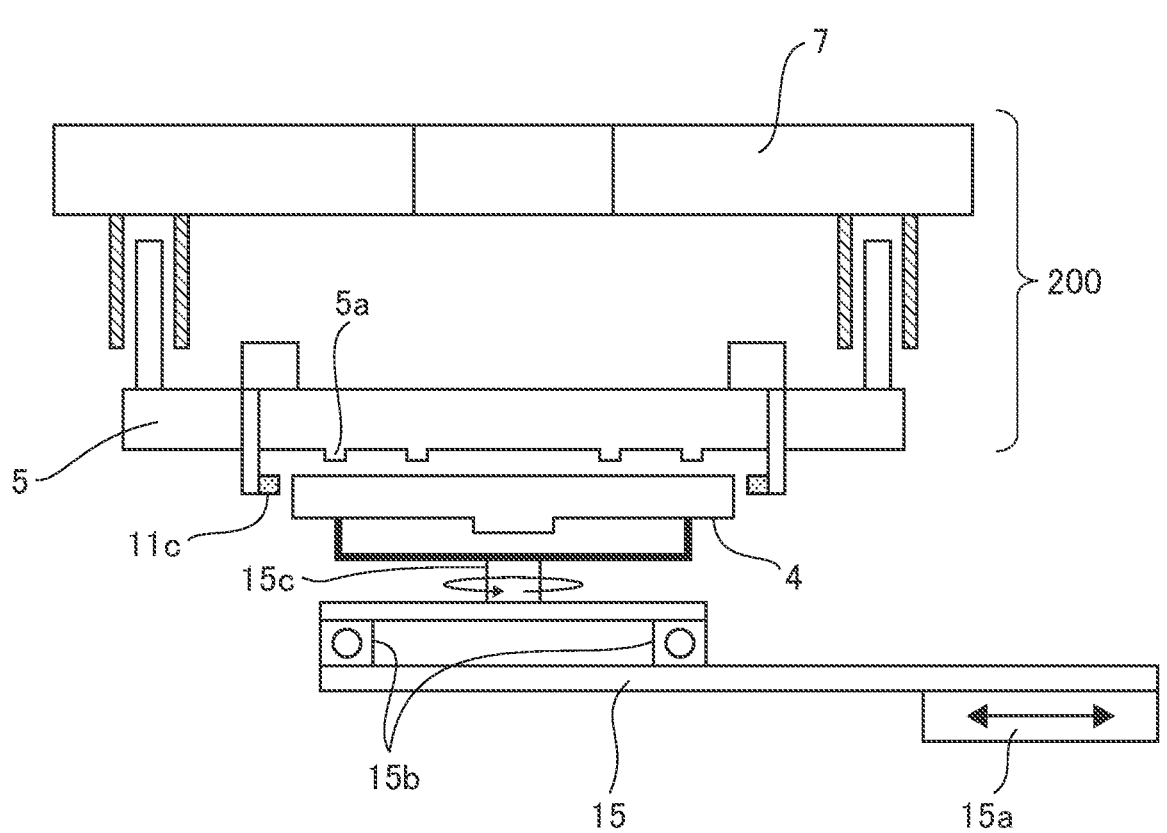
FIG. 10 is a view showing an example of the imprint head 200 and a conveyance hand 15 according to Third Embodiment.

FIG. 10 is a view showing an example of the imprint head 200 and a conveyance hand 15 according to Third Embodiment. As shown in FIG. 10, an X axis direction adjustment portion 15a, a Y axis direction adjustment portion 15b, and a Oz direction adjustment portion 15c are provided in the conveyance hand 15.

Further, based on the detection values from the mold sensors 13a, 13b, and 13c and previous positional data stored in the memory, the position of the mold 4 is forced with high accuracy so that the mold is held at the same position as the previous position.

Further, by adjusting forces of the load cells 11*c* applying the control parameters for the load cells 11*c* stored in the memory, the mold 4 can be held in the mold holding portion 5 in a state in which the amount of mold deviation is small.

Regarding the X axis direction adjustment portion 15*a*, the Y axis direction adjustment portion 15*b*, and the Oz direction adjustment portion 15*c* for adjusting the conveyance position with high accuracy, it is desirable to use drive sources having fewer sliding portions, such as linear motors, shaft motors, or voice coil motors. However, contact-type drive sources such as ball screw motors or air cylinders may also be used by providing foreign matter suctioning measures.

In the adjustment flow of Third Embodiment, even when there is a need to measure the amount of mold deviation for checking, compared to the adjustment flows in First Embodiment and Second Embodiment shown in FIG. 6, there is no need to change and check each of the control parameters. Therefore, adjustment can be performed within a shorter period of time than First Embodiment and Second Embodiment, and thus it is possible to contribute to improvement in productivity.

Fourth Embodiment

Next, Fourth Embodiment related to a method for manufacturing an article (a semiconductor IC element, a liquid crystal display element, a MEMS, or the like) by an imprint apparatus will be described. In Fourth Embodiment, the method for manufacturing an article has a pattern forming step of forming a pattern, in which the imprint apparatus performs imprinting of a substrate coated with an imprint material serving as a resist using the mold 4.

Further, an article is manufactured by executing a step of postprocessing (a processing step of manufacturing an article from an imprinted substrate) after a separation step of mold-releasing.

That is, the method for manufacturing an article according to Fourth Embodiment has a forming step of forming a pattern on a substrate using an imprint apparatus, and a processing step processing the substrate having the pattern formed in the forming step. The foregoing step of postprocessing includes etching, resist peeling, dicing, bonding, packaging, and the like.

According to the method for manufacturing an article according to Fourth Embodiment of the present invention, adjustment of the position of a mold (stabilizing operation) can be efficiently performed, and therefore the yield can be improved and an article having higher quality than that in the related art can be manufactured.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imprint apparatus and the like through a network or various storage media. Then, a computer (or a CPU, an MPU, or the like) of the imprint apparatus and the like may be configured to read and execute the program. In such a case, the program and the storage medium storing the program configure the present invention.

In addition, the present invention includes those realized using at least one processor or circuit configured to function of the embodiments explained above, for example. Dispersion processing may be performed using a plurality of processors.

This application claims the benefit of priority from Japanese Patent Application No. 2023-063629, filed on Apr. 10, 2023, which is hereby incorporated by reference herein in its entirety.

What is claimed is:

1. An imprint apparatus performing imprint processing for molding an imprint material on a substrate using a mold, the imprint apparatus comprising:

a shape correction mechanism configured to correct a shape of the mold using a plurality of contact portions for applying forces to side surfaces of the mold; and at least one processor or circuit configured to function as:

a detection unit configured to detect contact states of the plurality of contact portions by measuring positional deviation of the mold resulting from the contact portions contacting the side surfaces of the mold, using one or more mold sensors that measure a movement of the side surfaces of the mold; and a control unit configured to perform a stabilizing operation of moving the mold toward a stable position by adjusting drive timings of the plurality of contact portions, based on the measured positional deviation, in accordance with an output of the detection unit, wherein the adjusting of the drive timings includes advancing or delaying contact timing of respective contact portions in accordance with a direction of the positional deviation to reduce movement of the mold in each direction.

2. The imprint apparatus according to claim 1, wherein the control unit performs the stabilizing operation at least before imprint processing.

3. The imprint apparatus according to claim 1, wherein the control unit adjusts the drive timings of the plurality of contact portions while feeding back outputs of the detection unit.

4. The imprint apparatus according to claim 1, wherein the detection unit detects the contact states by measuring positions of marks provided in the mold.

5. The imprint apparatus according to claim 1, wherein the control unit controls drive forces of the plurality of contact portions so as to adjust an error of the detection unit.

6. The imprint apparatus according to claim 1, further comprising a holding unit configured to hold the mold in an imprint head, wherein the control unit performs the stabilizing operation in a state in which the mold is not held in the imprint head by the holding unit.

7. The imprint apparatus according to claim 6, wherein the control unit performs the stabilizing operation in a state in which the mold is not held in the imprint head by the holding unit, and then performs the stabilizing operation in a state in which the mold is held in the imprint head by the holding unit.

8. The imprint apparatus according to claim 1 further comprising:

a memory configured to store parameters related to adjustment of the drive timings of the plurality of contact portions when the stabilizing operation is performed by the control unit.

9. The imprint apparatus according to claim 8, wherein the memory stores the parameters related to adjustment of the drive timings of the plurality of contact portions for each of the molds when the stabilizing operation is performed by the control unit, and performs the next stabilizing operation using the stored parameters when the mold is used.

10. An imprint method for performing imprint processing for molding an imprint material on a substrate using a mold, the imprint method comprising:

correcting a mold shape using a plurality of contact portions for applying a force to side surfaces of the mold;

detecting contact states of the plurality of contact portions by measuring positional deviation of the mold resulting from the contact portions contacting the side surfaces of the mold, using one or more mold sensors that measure a movement of the side surfaces of the mold; and performing a stabilizing operation of moving the mold toward a stable position by adjusting drive timings of the plurality of contact portions, based on the measured positional deviation, in accordance with an output of the detection, wherein the adjusting of the drive timings includes advancing or delaying contact timing of respective contact portions in accordance with a direction of the positional deviation to reduce movement of the mold in each direction.

11. A method for manufacturing an article using an imprint method for performing imprint processing for molding an imprint material on a substrate using a mold, wherein the imprint method includes:

correcting a mold shape using a plurality of contact portions for applying a force to side surfaces of the mold;

detecting contact states of the plurality of contact portions by measuring positional deviation of the mold resulting from the contact portions contacting the side surfaces of the mold, using one or more mold sensors that measure a movement of the side surfaces of the mold; and performing a stabilizing operation of moving the mold toward a stable position by adjusting drive timings of the plurality of contact portions, based on the measured positional deviation, in accordance with an output of the detection, wherein the adjusting of the drive timings includes advancing or delaying contact timing of respective contact portions in accordance with a direction of the positional deviation to reduce movement of the mold in each direction, and wherein the method for manufacturing the article comprises:

forming a pattern on the substrate using the imprint method; and processing the substrate having the pattern formed thereon in the forming.

* * * * *